United States Patent [19]

Hosaka et al.

[11] 4,307,154
[45] Dec. 22, 1981

[54] MAGNETIC RECORDING MEDIUM

[75] Inventors: Akihiko Hosaka; Kazushi Tanaka, both of Saku, Japan

[73] Assignee: TDK Electronics Co., Ltd., Tokyo, Japan

[21] Appl. No.: 92,992

[22] Filed: Nov. 9, 1979

[30] Foreign Application Priority Data

Nov. 13, 1978 [JP] Japan .................... 53-138841

[51] Int. Cl.³ .............................. G11B 5/70
[52] U.S. Cl. .................... 428/413; 252/62.54; 360/134; 428/423.7; 428/424.6; 428/425.9; 428/694; 428/900
[58] Field of Search ............ 428/900, 425.9, 644, 428/695, 413, 423.7, 424.6, 483; 252/62.54; 427/127, 128; 360/134, 135, 136

[56] References Cited

U.S. PATENT DOCUMENTS

| 3,247,017 | 4/1966 | Eichler et al. | 428/900 |
| 3,320,090 | 5/1967 | Graubert | 428/425.9 |
| 3,650,828 | 3/1972 | Higashi et al. | 252/62.54 |
| 3,689,317 | 9/1972 | Akashi et al. | 428/900 |
| 3,740,266 | 6/1973 | Akashi et al. | 428/900 |
| 3,840,400 | 10/1974 | Yamada et al. | 428/413 |
| 3,911,196 | 10/1975 | Navidad | 428/900 |

FOREIGN PATENT DOCUMENTS

| 51-10914 | 1/1976 | Japan | 427/128 |
| 661600 | 5/1979 | U.S.S.R. | 428/900 |

*Primary Examiner*—Stanley S. Silverman
*Attorney, Agent, or Firm*—Wyatt, Gerber, Shoup, Scobey & Badie

[57] ABSTRACT

A magnetic recording medium having improved electromagnetic conversion characteristics and physical properties prepared by using a three-component binder consisting of a polyurethane resin, a phenoxy resin and a vinyl chloride-vinylidene chloride resin.

3 Claims, 1 Drawing Figure

MAGNETIC RECORDING MEDIUM

BACKGROUND OF THE INVENTION

This invention relates to a magnetic recording medium.

At the present time, the magnetic recording medium commonly consists of a backing material coated with a mixture of magnetic powder and binder. With the expanding applications, there is a growing demand for further improvements in properties of the medium.

The binders thus far employed widely have been two-component combinations of vinyl chloride-vinyl acetate, acrylonitrile, cellulose, ester, urethane, ethylene, epoxy and other resins, especially the combinations of a polyurethane resin with a vinyl chloride-vinyl acetate copolymer resin or with a nitrocellulose resin. Those two-component binders have, however, had a disadvantage in that the electromagnetic conversion and physical properties of the resulting magnetic coating are antagonistic in relation to the mixing ratio of the two binder components and therefore it is extremely difficult to meet the both property requirements, and attainment of satisfactory properties cannot be expected.

In view of these, the present invention has for its object the provision of a magnetic recording medium improved in the electromagnetic conversion characteristic that is most important and indispensable of the requirements for a medium of this character and in repeated running stability and bonding strength, both typical of the physical properties required, without impairing the usually antagonistic property of surface smoothness.

It has now been found that a magnetic recording medium generally superior to the conventional medium containing the two-component binder in properties, such as the stability on repeated runs past the head, bonding strength, electromagnetic conversion characteristic, and gloss, can be manufactured by employing a three-component system of a polyurethane resin, a phenoxy resin, and a vinyl chloride-vinylidene chloride resin as the binder of the magnetic coating material for the medium.

BRIEF DESCRIPTION OF THE DRAWING

The FIGURE in the accompanying drawing is a composition diagram of the three-component binder for use in the manufacture of the magnetic recording medium according to the invention.

DESCRIPTION OF THE INVENTION

Figure 1:
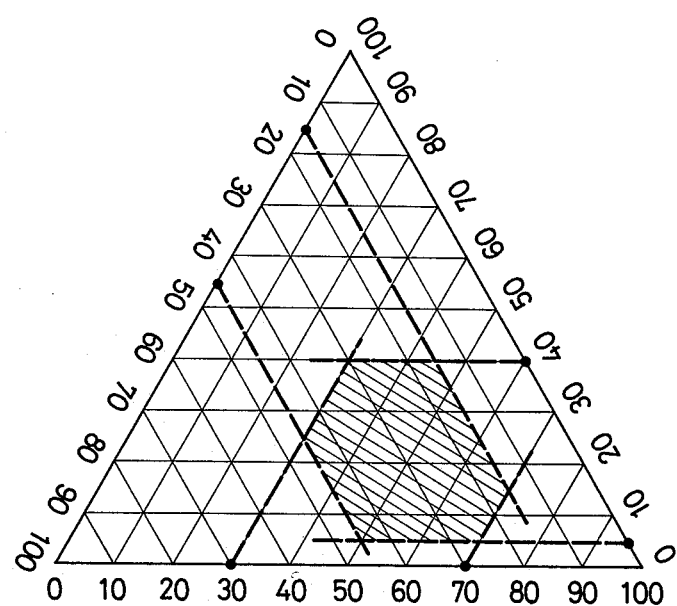

This invention provides a magnetic recording medium comprising a base support and a layer of a magnetic coating material on said base support, said magnetic coating material comprising a powdered magnetic material dispersed in a binder, characterized in that the binder is a three-component system consisting of a polyurethane resin, a phenoxy resin, and a vinyl chloride-vinylidene chloride resin.

According to this invention, the binder in the magnetic coating material should essentially consist of the three components, i.e., a polyurethane resin, a phenoxy resin, and a vinyl chloride-vinylidene chloride resin. As the polyurethane resin for use in the three-component binder of the invention, many of the commercially available polyurethane resins may be employed. Particularly desirable are those having an -OH group in the terminal position. Typical polyurethane resins of commerce are, for example, "Nippollan 5033", "Nippollan 5032", and "Nippollan 3022" (all trade-marks; Nippon Polyurethane Industry Company), and "Estane 5702" and "Estane 5703" (both trademarks; B. F. Goodrich Chemical Company). Useful phenoxy resins include "PKHH" and "PKHC" (both trademarks; Union Carbide Corporation). The vinyl chloride-vinylidene chloride resin may, for example, be "Denka Vinyl #1000W" or "#1000WK" (both trademarks; Denki Kagaku Kogyo).

The proportions or percentages of the resin components in the three-component binder of the invention, all by weight, are desired to come within the hatched region in the diagram of the FIGURE. To be more specific, the vinyl chloride-vinylidene chloride resin preferably ranges from 5 to 40%, the polyurethane resin from 30 to 70%, and the phenoxy resin from 15 to 45%. If the proportion of the vinyl chloride-vinylidene chloride resin is less than 5%, the repeated running stability of the resulting recording medium will be adversely affected. On the other hand, a proportion of over 40% will improve the coating film in its surface properties but will tend to reduce its bonding strength. If the polyurethane resin accounts for less than 30% of the binder composition, the surface properties and bonding strength of the coating film will deteriorate. Conversely if it accounts for more than 70%, the bonding strength will improve at the penalty of an increased friction coefficient, with an unfavorable effect upon the repeated running stability. Less than 15% phenoxy resin will aggravate the repeated running stability but the resin proportion of over 45% will hinder the dispersion of the coating material and hence will not improve the surface quality of the coating film and will lower its electromagnetic conversion characteristic.

Next, a magnetic coating material is prepared by mixing the three-component binder of the composition as above described with a powdered magnetic material such as magnetic iron oxide, for example, $\gamma$-Fe$_2$O$_3$, Co-doped $\gamma$-Fe$_2$O$_3$; and additives such as a dispersent, lubricant, curing agent, solvents and the like, which are usually used in manufacturing an electromagnetic recording medium of this character. Then the magnetic coating material is applied onto a base support such as polyester films, cellosic films and the like. The preparation and application on the base support of the magnetic coating material of the invention can be accomplished by the techniques known in the art, and therefore the detailed explanation is omitted.

The magnetic recording medium, for example a tape for magnetic recording, manufactured by making use of the advantageous effects of the three-component binder of the invention are quite excellent in both electromagnetic conversion characteristics and other physical properties, as will be detailed below.

The invention is illustrated by the following examples.

EXAMPLE 1

Manufacture of magnetic tape

A composition consisting of

| | |
|---|---|
| $\gamma$-Fe$_2$O$_3$ powder (cobalt-doped) | 400 parts by weight |
| Dispersant (lecithin) | 8 parts by weight |
| Polyurethane resin ("Nippollan 5033" marketed by Nippon | |

-continued

| | |
|---|---|
| Polyurethane Ind.) | 50 parts by weight |
| Phenoxy resin ("PKHC" by UCC) | 30 parts by weight |
| Vinyl chloride-vinylidene chloride resin ("#1000WK" by Denki Kagaku Kogyo) | 20 parts by weight |
| Lubricant | 5 parts by weight |
| Methyl ethyl ketone | 500 parts by weight |
| Methyl isobutyl ketone | 200 parts by weight |
| Cyclohexanone | 200 parts by weight | was thoroughly mixed for dispersion in a ball mill. With the addition of 12 parts by weight of a curing agent polyisocyanate ("Desmodur L" by Sumitomo Bayer Urethane Co.), the whole mixture was mixed with agitation to prepare a homogeneous coating solution. This solution was applied on a 12 μ-thick polyester film to form a coating layer which would be 6μ thick when dry. After a surface treatment by super calendering, the coating film was cured by heating at 60° C. for 48 hours to form a tape sheet. The sheet was then slitted into strips 3.81 mm in width as test pieces of audio-frequency magnetic recording tape.

EXAMPLE 2

The same procedure as described in Example 1 was followed except that the proportions of the polyurethane resin, phenoxy resin, and vinyl chloride-vinylidene chloride resin in the binder composition were varied to obtain various audio-frequency magnetic recording tapes. The test pieces were tested for their properties, i.e., the bonding strength, repeated running stability, electromagnetic conversion characteristic, and surface gloss.

Table 1 given below summarizes the binder compositions and the properties of the resulting magnetic tape test pieces.

For the purposes of the invention the term "bonding strength" is defined to be the strength required to peel the magnetic coating film and the base film 180 degrees apart, in grams per ⅛ in. of width of the test tape. The "electromagnetic conversion characteristic" and "gloss" (as measured by a glossmeter "Model GH 5" made by Murakami Colors) are indicated as relative values based on the values of Test piece I which are both zero decibel (dB).

TABLE 1

| | Binder composition | | | Properties | | | |
|---|---|---|---|---|---|---|---|
| Text piece | Polyurethane | Phenoxy | Vinyl chloridevinylidene chloride | Bond str (g) | Repeated running stability (No. of runs) | Electromag conversion characteristic 10 KHz(dB) | Gloss (dB) |
| A | 65 | 30 | 5 | 45 | 1250 | +0.2 | +0.3 |
| B | 70 | 15 | 15 | 40 | 1000 | +0.3 | +0.5 |
| C | 40 | 20 | 40 | 30 | 1150 | +0.2 | +0.7 |
| D | 50 | 50 | — | 120 | 90 | −2.5 | −3.0 |
| E | 50 | — | 40 | 30 | 350 | +0.3 | +0.5 |
| F | 75 | — | 25 | 45 | 170 | +0.2 | +1.1 |
| G | 25 | — | 75 | 5 | 590 | +0.3 | +1.0 |
| H | 35 | 45 | 20 | 35 | 1150 | −0.3 | −0.5 |
| I | 50 | 30 | 20 | 40 | 1200 | 0 | 0 |

As can be seen from the results summarized in Table 1, the magnetic tapes using the three-component binders A, B, C, H, and I that conform to this invention are excellent in bonding strength, repeated running stability, electromagnetic conversion characteristic, gloss and other properties. Generally, they may be said to be magnetic tapes with outstanding properties.

The tapes using two-component binders D, E, F, and G, by contrast, have general properties problematic in practical use, although they are excellent in one point or another.

The amount of the curing agent to be added is desirably between 5 and 20 parts by weight on the basis of the weight of the binder. With less than 5 parts by weight of the agent, almost no cross-linking effect will be expected. More than 20 parts by weight of the agent will lessen the bonding strength of the coating relative to the base film.

What is claimed is:

1. A magnetic recording medium comprising a base support and a layer of a magnetic coating material on said base support, said magnetic coating material comprising a magnetic material dispersed in a binder containing three resin components, namely from 30 to 70% of a polyurethane resin, from 15 to 45% of a phenoxy resin and from 5 to 45% of a vinyl chloride-vinylidene chloride resin, all percentages being by weight.

2. A magnetic recording medium according to claim 1, wherein said powdered magnetic material is Co-doped $\gamma$-$Fe_2O_3$.

3. A magnetic recording medium according to claim 1, wherein said base support is a polyester film.

* * * * *